Jan. 25, 1966  R. H. SPENCER  3,231,815
PARTICLE DETECTION APPARATUS USING FIXED FREQUENCY
OSCILLATOR COUPLED TO RESONANT CIRCUIT
Filed Feb. 7, 1962
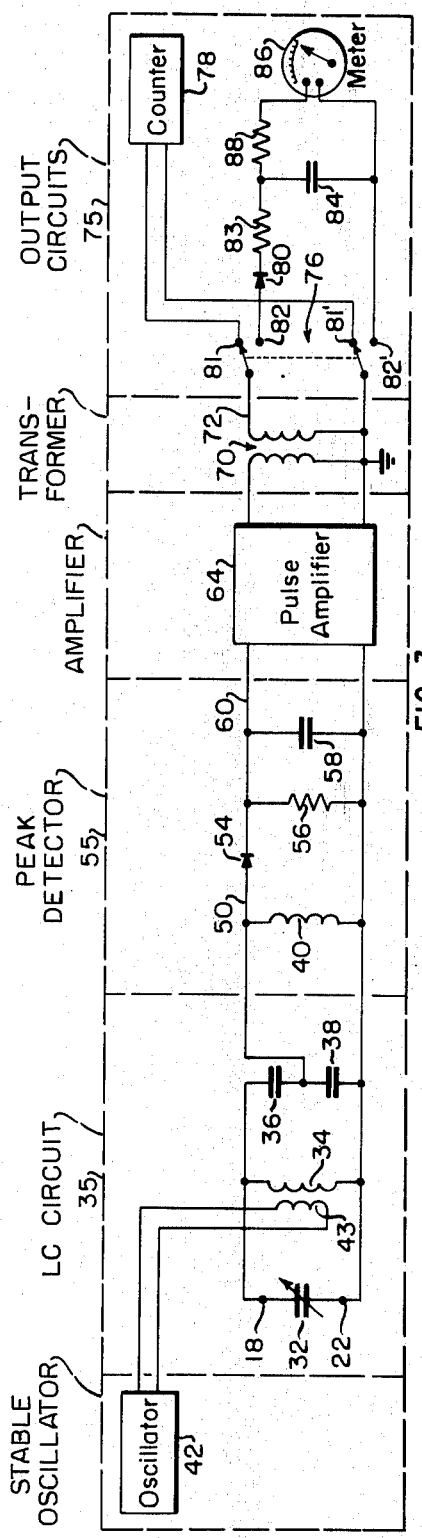
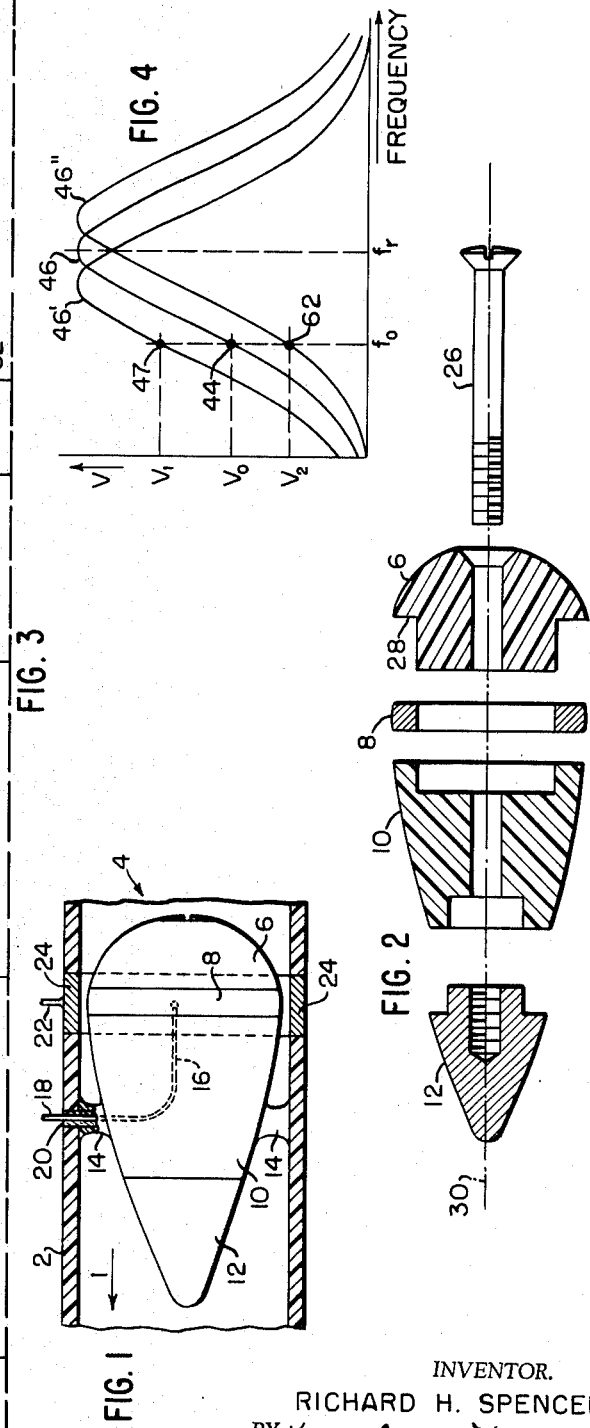
INVENTOR.
RICHARD H. SPENCER
BY
ATTORNEYS

United States Patent Office 3,231,815
Patented Jan. 25, 1966

3,231,815
PARTICLE DETECTION APPARATUS USING FIXED FREQUENCY OSCILLATOR COUPLED TO RESONANT CIRCUIT
Richard H. Spencer, Winchester, Mass., assignor to United Research Inc., Cambridge, Mass., a corporation of Massachusetts
Filed Feb. 7, 1962, Ser. No. 171,702
5 Claims. (Cl. 324—61)

My invention relates generally to the detection of contaminants in fluid and more particularly to the detection of low concentrations of particles in fluids.

In certain applications, such as modern high performance aircraft, the fuel used in the engines must be of a very high purity. Unfortunately, while the fuel must be extremely clean when delivered to the aircraft, it is often stored under adverse conditions. For example, the tanks or other containers in which the fuel is stored may accumulate substantial quantities of rust on their interior surfaces. From time to time natural distintegration or intermittent vibration will dislodge particles of this rust into the fluid. In addition, sand and other forms of dirt may enter into couplings and container openings.

Since some applications are adversely affected by contaminating particles of even extremely small sizes, i.e. of the order of 25 microns in diameter, it is impractical to filter the fuel or other fluids immediately prior to use. A filter capable of extracting such small particles has an undesirably low transfer rate for any practical filter area. Therefore, it has been found desirable to determine the purity of the fuel being used and resort to filtration only when contamination exceeds permissible levels.

In the past, such determinations have normally been made by the examination of small samples from which the contaminating particle concentration may be determined by filtration or other examination techniques. However, a relatively large number of samples is required to obtain statistically significant results concerning the purity of an entire stored volume. Furthermore, the very act of sampling may introduce additional foreign materials into the storage containers as the samples are being extracted. In addition, the introduction of sample extraction mechanisms or containers may dislodge additional particles from the interior container surfaces. While taps may be provided for the securing of samples, samples obtained from fixed taps are unlikely to be representative of the condition of the entire stored volume.

Apparatus has previously been available which permits the continuous determination of some characteristics of a fluid stream, but such apparatus has not been of a form useful for detecting low concentrations of particles in the fluid. One group of the prior devices utilizes the change in conductivity or dielectric constant of the fluid to determine when the steady state contamination exceeds a given value. Other similar devices have been used to help identify the composition of the fluid itself, since, for instance, the dielectric constant differs for different petroleum products.

If a petroleum fuel or other fluid contains sufficient contaminants to give a reliable indication on such prior art detectors, it is clearly unsuited for the critical requirements with which my invention is concerned. Further, these prior detectors fail to give any indication of contamination, and thus pass as acceptable fuels which are in fact unsuited for the more critical applications.

Accordingly, it is an object of my invention to provide apparatus capable of continuously detecting and indicating extremely low particle concentrations.

Another object of my invention is to provide apparatus of the type described which provides information concerning particle concentrations without exposing the measured fluid to sources of contamination.

A further object of my invention is to provide apparatus capable of indicating the contamination per unit volume as the fluid is being delivered.

A still further object of my invention is to provide apparatus of the type described capable of indicating the total number of particles in a given volume of fluid.

Still another object of my invention is to provide apparatus of the type described for the indication of fuel contamination which is suitable for use in adverse environments, and which is simple, rugged and yet economical in construction.

These and other objects of my invention are achieved in apparatus wherein the presence of fluid contaminating particles in a fluid stream is utilized to provide a pulse train, each pulse corresponding to a particle in the fluid stream. Another feature of my invention is the use of a portion of the fluid under examination as the dielectric for the varying capacitor in the inductance-capacitance circuit of a detector. A further feature of my invention is the provision of counting means responsive to pulses from individual particles. Still another feature of my invention is the provision of averaging means to provide an indication of the volume of contaminating particles contained within a volume of fluid which has been examined or delivered.

My invention likewise involves the several features and details of the fluid examining apparatus hereinafter described and illustrated.

In the drawings:

FIG. 1 is a side view of a sensing element suitable for use with the fluid contamination measuring system of my invention;

FIG. 2 is an exploded view of a portion of the sensor illustrated in FIG. 1;

FIG. 3 is a circuit diagram, partially schematic and partially in block and line form of apparatus made according to my invention; and FIG. 4 illustrates variations in the voltage-frequency characteristic of an inductance-capacitance circuit such as that shown in FIG. 2, with variations in capacitance.

As shown in FIG. 1, a sensor suitable for use in a fluid transfer line or pipe 2 is illustrated. The arrow 1 indicates the direction of fluid flow past the sensor. This sensor includes a central inner body generally indicated at 4. This inner body has a forward nonconducting portion 6 fabricated of a material suitable for use in the fluid under examination. Tetrafluoroethylene resin plastics such as that marketed under the trademark "Teflon" are suitable for most applications. Following the forward nonconductive portion of the inner body is a band of conducting material 8. This band will normally be fabricated from metal such as brass if noncorrosive materials are involved, or of a more resistant material, such as stainless steel, if corrosive fluids are under examination. Following the conductive band 8 the central portion 10 of the inner body is also fabricated from nonconducting material such as "Teflon." The terminal portion 12 may be fabricated from either conducting or nonconducting material. Normally, it will be simpler to fabricate this section from some easily machined material such as brass. Three support struts 14 are provided to support the inner body of the sensor in a central position within the pipe 2. An electrical conductor 16 connects the conducting band 8 to the terminal 18 which is supported in the insulator 20 passing through one of the struts 14. The provision of three struts provides substantial rigidity and insures the maintenance of the inner body in its central position within the pipe with considerable precision. A second terminal connection 22 is provided from the fluid transfer pipe, or from a conducting section 24 inserted in the pipe, if the pipe itself is of a nonconducting material.

To insure the alignment of the conducting band 8 in the proper relationship to the pipe or to the conducting section 24, it is desirable to form the inner body structure of elements which maintain exact centering. As shown in the exploded view of FIG. 2, such centering can be maintained by having the end sections fit into a cylindrical recess within the central section 10. Both the forward section 6 and the rearward section 12 have cylindrical projections which maintain the central axis of each section in alignment. A bolt 26 serves to hold the three sections together. An annular recess 28 in the forward section 6 is provided for the conducting band 8. When the bolt 26 has secured the forward section 6 to the central portion 10, the conducting band 8 is held in positive alignment with the central axis 30 of the inner body.

In FIG. 3, I show a circuit arrangement of the slope detector used in my invention which incorporates a sensor according to FIG. 1. The capacitor 32 in the LC circuit section 35 is formed by the capacitance between the conducting band 8 and either the pipe itself or the conducting section 24. The two terminals 18 and 22 are connected at the indicated points on each side of the variable capacitance 32. An inductance 34 in parallel with the capacitor 32 constitutes the LC circuit. The resonant circuit formed by capacitor 32 and inductor 34 is excited by the fixed frequency oscillator 42 via the coil 43. Two capacitors 36 and 38, are connected in series and the series combination is connected in parallel with the LC circuit to provide a voltage divider. The output signal from the LC circuit which is processed in the circuits to be described, is the voltage appearing between the junction of the capacitors 36 and 38 and ground. The exact resonant frequency of the circuit is a function of the net inductance and capacitance of the parallel combination including the inductance 34, sensor 32 and the two voltage divider capacitors 36 and 38. The oscillator 42, which is a conventional stable oscillator, provides an output signal whose frequency is slightly lower than the resonant frequency of the LC circuit. I have found that a conventional crystal controlled oscillator using either vacuum tubes or transistors provides a satisfactory signal to the LC circuit.

FIG. 4 illustrates the effect of variations in the resonant frequency of the LC circuit with variations in value of the capacitor 32 formed by the sensor. The frequency $fo$ of the oscillator 42 is chosen so that when no particles are present the oscillator frequency intersects the curve of voltage output as a function of frequency 46 at the point 44 and provides an output voltage $V_0$. However, if a particle having a higher dielectric constant than the fluid passes through the sensor, the capacitance of the condenser 32 is increased lowering the resonant frequency of the LC circuit. This results in the LC circuit having the characteristic curve 46′, which intersects the oscillator frequency at the point 47 and provides a higher output voltage $V_1$. In an exactly similar manner, a particle of lower dielectric constant in the fluid produces the characteristic curve 46″ and an output voltage $V_2$. The resonant frequency of the LC circuit is shifted only momentarily by the presence of a particle and as soon as the particle leaves the sensor, the resonant frequency returns to the original value. Thus, the curves 46′ and 46″ exist only momentarily during the passage of a particle through the sensor. It would of course be possible to operate the LC circuit with a normal resonant frequency below that of the stable oscillator 42 if desired.

In summary a particle causes the characteristic curve of the LC circuit to shift to the left or to the right as shown in FIG. 4 (depending upon whether its dielectric constant is greater or less than that of the fluid) and the output signal from the circuit is the intersection of the curve with the vertical line representing the oscillator frequency. Since the characteristic curve for a resonant circuit is very nearly linear for small changes, along its sloping sides the change in output voltage is very nearly directly proportional to the change in capacity caused by a particle passing through the sensor.

The relationship between the oscillator frequency $fo$ to the desired location of the point 44 can best be expressed in terms of the bandwidth of the frequency response curve 46 of the LC circuit. In general, it is preferable to set the frequency of the oscillator 42 so that it intersects the frequency response curve of the LC circuit close to either of the extremes of the bandwidth of the resonance curve, i.e. at that frequency which produces approximately 0.707 of the response at resonance. This frequency is, by definition, ½ the bandwidth of the resonant circuit above or below resonance. The frequency response curves for inductance capacitance circuits exhibit their greatest slope and also have their greatest linearity in this region. In the present application, a large slope means greater sensitivity in the system and the linearity of the curve in this region is also a desirable attribute.

While I have mentioned the above setting as being desirable, it is not critical. If lower gain, or linearity may be tolerated any setting of the frequency of the oscillator 42 may be used which falls within the range between the extremes of about 4 times the bandwidth of the resonance curve and 0.2 times the bandwidth. In other words in practice I have found that frequencies ranging from twice the bandwidth below resonance to within $\frac{1}{10}$ of the bandwidth below resonance are useful, and a similar range above resonance. However, the preferable frequency for the oscillator 42 appears to be that which is ½ the bandwidth below or above the resonant frequency as mentioned above.

As shown in FIG. 3, a voltage output from the LC circuit is coupled out from the junction of capacitors 36 and 38 on lead 50 and serves as an input to the peak detector circuitry contained within the dotted rectangle 55. When a particle passes through the sensor, a momentary change in the radio frequency voltage on line 50 occurs. An example of such a change is the increase corresponding to operation at point 47 just discussed in connection with FIG. 4. When the voltage on line 50 rises momentarily because of such changed operating conditions, the output voltage from peak detector 55 increases.

The peak detector is composed of the diode rectifier 54 which feeds into the parallel combination of resistor 56 and capacitor 58. The peak detector recovers the envelope of the radio frequency signal supplied to it on lead 50. The radio frequency choke 40 provides a direct current return to ground for proper operation of the detector.

The output signal from the peak detector is a direct voltage whose amplitude corresponds to the output from the detector when no particles are present, i.e. the operating point 44 in FIG. 4. Superimposed on this direct voltage are pulses of polarity dependent upon the dielectric constant of the particles generating them. The height and length of the pulses is related to the particle size and to the particle dielectric constant.

The output from the peak detector is applied through the conductor 60 to the pulse amplifier section 64. The amplifier 64 is an alternating voltage amplifier so that only pulses from the peak detector are transmitted. The direct voltage component of the peak detector output is blocked. The pulse amplifier may be a conventional resistance-capacitance coupled amplifier utilizing standard vacuum tube or transistor circuitry. The reliable operation obtained with transistor circuitry makes its use preferable for applications requiring continued operation remote from servicing facilities. In addition, the transistor circuitry simplifies operation from portable battery power supplies when such operation is necessary.

The amplified pulses from the amplifier 64 are transmitted to the pulse transformer 70 which provides an impedance match between the amplifier and the output circuits. The impedance ratio provided by the transformer has no effect upon the basic circuit operations other than to increase the efficiency of the coupling between the amplifier and the output circuits.

The output from the transformer appears on lead 72 which is connected to the output circuits contained within the rectangle 75. In the embodiment shown in FIG. 3, two output circuits have been provided. The ganged switch 76 serves to connect the output with terminal pair 81, 81' or terminal pair 82, 82'. With the switch contacts in the upper position to contact terminals 81 and 81', the output is fed to a pulse counter 78. The counter 78 will register a count corresponding to the number of particles which have passed through the sensor in the fuel line. As discussed above, each particle passing through the sensor causes a change in the value of capacitance 32 which produces a pulse detected by peak detector 55. This pulse is amplifier by the amplifier 64 and supplied by the transformer 70 to the counter 78. Thus, the embodiment of FIG. 3 with the switch 76 in position to contact terminals 81 and 81' will give the total particle count within a given volume of fluid, if the count at the beginning and end of the transmission of that volume is noted. Of course, if both positive and negative pulses are anticipated, the counter should respond to both types of pulses.

If the switch 76 is shifted so that terminals 82 and 82' are contacted, the output pulse train is applied through diode 80 to the averaging circuit composed of resistor 83 and condenser 84. The signal from the averaging circuit will be representative of the average over a period of time of the area and number of pulses supplied to it. The pulse area in turn is dependent upon the size of the particle passing through the sensor. Hence the output signal of the averaging circuit shown in FIG. 3 is a measure of the total concentration of contaminant whose dielectric constant is greater than that the fluid passing through the sensor. If it is desired to obtain a measure of the concentration of contaminant whose dielectric constant is less than that of the fluid, a second averaging circuit (not here illustrated) is necessary in which the diode polarity is reversed. Typically, the resistor 83 might be 33,000 ohms and the condenser 300 microfarads. A conventional microammeter 86 placed across the condenser 84 will indicate the average concentration of contaminant. A suitable meter sensitivity would be 50 microamperes. Of course, the low value of meter resistance would lower the averaging circuit time constant if it were placed directly across the capacitor. Accordingly, I place a large resistor 88 typically about 33,000 ohms, in series with the meter 86. While even such a sensitive meter would have insufficient sensitivity to respond to the output produced by a single particle, its sensitivity is adequate to respond to the averaged output resulting from the pulses received due to a succession of particles in the fluid. Thus, the meter 86 serves to give an indication of the concentration of particle contaminant passing through the sensor in the fluid line 2. The time constant of the averaging circuit, determined by the values of the resistors 83 and 84 and the capacitor 84, will determine the length of the period of fluid flow for which the meter gives a concentration indication. That is, a long time constant for the circuit will mean that the meter indicates the particle concentration average over relatively long periods of time.

While the counter and the meter have been discussed as alternative outputs, it will be apparent that the counter and meter may be operated simultaneously if desired. Thus, the operator can have available both a total count during the study of a volume of fluid as well as an indication of the average contamination at any time.

Systems of my invention constructed according to the circuit of FIG. 3 have been successfully operated to detect extremely small particle concentrations. In one such test, a stable crystal oscillator with a frequency of 21.4 megacycles was utilized. This crystal oscillator fed an LC circuit comprised of a sensor according to FIG. 1 with a spacing of 0.008 inch between the conducting band 8 and the pipe 2 which was of conducting material. The coil 34 was formed with 20 turns and the capacitors 36 and 38 were five and ten microfarads, respectively. The inductor 40 was a 100 microhenry choke. The output from this LC circuit was fed to a conventional peak detector comprised of a diode input feeding a parallel resistance-capacitance network having a time constant suitable for the operating frequency. The detected pulses were amplified and utilized to provide a meter output as described above. It was found that the detector would reliably detect particles of about 20 microns in size. Other tests indicated that particles whose diameter was approximately 1/10 of the radial gap spacing could be reliably detected for a wide range of gap dimensions.

In the above-described test, the pulses obtained were typically between 100 and 200 microseconds in duration. Pulses of this duration may be easily amplified by conventional circuitry. If the concentration of particles is sufficiently high so that the pulse outputs overlap, then the apparatus will begin to saturate; for greater contamination the indicated output will continue to increase but not in a linear manner. However, one second contains 5,000 two hundred microsecond intervals. Thus, with a range in pulse durations from 100 to 200 microseconds, from five to ten thousand particles per second can be detected before the equipment saturates markedly.

Any concentration of particles in the fluid sufficient to saturate the equipment of my invention is contaminated to an extent far beyond the range normally considered in the critical applications for which my equipment is designed. Moreover, precise information concerning greater particle concentrations can be obtained by reducing the orifice area of the sensor while maintaining the same electrode spacing and linear velocity of flow. This arrangement decreases the number of pulses counted in a given time interval, but since the linear flow rate is maintained, does not increase the pulse length.

Alternatively, the fluid to be checked may be diluted by a known amount with an uncontaminated fluid. It will thus be seen that I have provided an improved system for the detection of particle contaminants in a fluid. By using a stable fixed frequency oscillator to feed a parallel LC circuit with a frequency different from its resonant frequency, but which falls about one half bandwidth above or below the resonant frequency of the LC circuit, changes in the capacity of an element of the LC circuit will cause substantially proportional electrical signals to be generated. In my invention, such changes are caused by the particles passing through a sensor. After detection, the pulses resulting from particle flow through the sensor are amplified and counted or averaged over a unit time to give measures of total contamination, or average contamination respectively.

While my invention has been described in conjunction with certain preferred embodiments, it will be recognized that those skilled in the art can make modifications in the sensing elements or the circuitry without departing from the scope of my invention. Similarly, while the invention has been described in conjunction with contaminating particles, for some applications it is desired to introduce a known concentration of particles. My invention works equally well with all particles, whether they be desired or undesired in the final fluid use.

Having thus described my invention, I claim:

1. Apparatus for the detection of particles in a fluid comprising, in combination, a fluid transfer pipe, a capacitive sensor within said pipe, said fluid serving as the dielectric of said capacitive sensor, an inductance-capacitance circuit, said inductance-capacitance circuit including said capacitive sensor connected in parallel with an inductor, said inductance-capacitance circuit having a resonant frequency, a fixed frequency oscillator for producing an alternating voltage, the frequency of said alternating voltage being different from the resonant frequency of said inductance-capacitance circuit, means connecting the alternating voltage produced by said oscillator to said inductance-capacitance circuit, a peak detector having input and output terminals for providing a voltage varying in accordance with the amplitude envelope of signals at said oscillator frequency supplied thereto, means connecting said inductance-capacitance circuit in parallel across the input terminals of said peak detector, a pulse amplifier having input and output terminals, means connecting the output terminals of said peak detector to the input terminal to said pulse amplifier, pulse-operated display means, and means connecting the output terminal of said pulse amplifier to said pulse-operated display means.

2. The combination defined in claim 1 in which the frequency of said oscillator falls within the range defined by frequencies two bandwidths below the resonant frequency of said LC circuit when no particles are passing through said sensor and 1/10 bandwidth below said resonant frequency and 1/10 bandwidth above said resonant frequency to two bandwidths above said resonant frequency.

3. The combination defined in claim 1 in which the frequency of said oscillator is selected from frequencies about one half bandwidth below and frequencies about one half bandwidth above the resonant frequency of said LC circuit when said sensor has no particles passing therethrough.

4. The combination defined in claim 1 in which said pulse-operated display means includes a pulse counter.

5. The combination defined in claim 1 in which said pulse-operated display means includes a pulse averaging circuit responsive to pulses of a first polarity, and means for measuring the averaged value of said pulses.

References Cited by the Examiner
UNITED STATES PATENTS

| | | | |
|---|---|---|---|
| 2,380,791 | 7/1945 | Rosencrans | 250—39 |
| 2,599,583 | 6/1952 | Robinson | 324—61 |
| 2,662,408 | 12/1953 | Ellison | 324—61 |
| 2,747,095 | 5/1956 | Boucke | 331—65 X |
| 2,772,393 | 11/1956 | Davis | 331—65 X |
| 2,807,720 | 9/1957 | Charles | 331—65 |
| 2,917,732 | 12/1959 | Chase et al. | 324—41 |
| 3,142,985 | 8/1964 | Seaver | 324—61 X |

WALTER L. CARLSON, *Primary Examiner.*

FREDERICK M. STRADER, *Examiner.*

D. R. GREENE, E. E. KUBASIEWICZ,
*Assistant Examiners.*